United States Patent
Crichton (10) Patent No.: US 9,353,883 B2
(45) Date of Patent: May 31, 2016

(54) EXCESS PRESSURE SAFETY RELIEF VALVE

(71) Applicant: APEX VALVES LIMITED, Auckland (NZ)

(72) Inventor: David Gordon Arthur Crichton, Rodney (NZ)

(73) Assignee: APEX VALVES LIMITED (NZ)

( * ) Notice: Subject to any disclaimer, the term of this patent is extended or adjusted under 35 U.S.C. 154(b) by 228 days.

(21) Appl. No.: 14/134,138

(22) Filed: Dec. 19, 2013

(65) Prior Publication Data

US 2014/0174566 A1 Jun. 26, 2014

(51) Int. Cl.
*F16K 15/14* (2006.01)
*F16K 31/385* (2006.01)

(52) U.S. Cl.
CPC ............ *F16K 31/385* (2013.01); *F16K 15/142* (2013.01); *Y10T 137/7837* (2015.04); *Y10T 137/7896* (2015.04)

(58) Field of Classification Search
CPC ... F16K 15/142; F16K 31/128; F16K 31/126; F16K 31/24; F16K 31/30; F16K 31/18; F16K 31/365; F16K 31/385; Y10T 137/27; Y10T 137/479
USPC .................. 137/411, 413, 414, 441, 443, 860; 251/25, 30.03, 30.05, 61–63.6
See application file for complete search history.

(56) References Cited

U.S. PATENT DOCUMENTS

| | | | | |
|---|---|---|---|---|
| 3,298,394 A * | 1/1967 | Chorkey | ............... | F16K 15/142 137/516.15 |
| 3,493,270 A * | 2/1970 | Doerfler | ................. | B01D 17/02 137/493.9 |
| 5,975,507 A * | 11/1999 | Cotter | ....................... | F16F 9/43 267/64.11 |
| 7,458,392 B2 * | 12/2008 | Cornwell | .............. | F16K 15/142 137/529 |
| 7,647,938 B2 * | 1/2010 | Jobe | ......................... | E03D 1/32 137/15.26 |

* cited by examiner

*Primary Examiner* — Mary McManmon
*Assistant Examiner* — Hailey K Do
(74) *Attorney, Agent, or Firm* — Garcia-Zamor IP Law; Ruy M. Garcia-Zamor (57) ABSTRACT

A liquid pressure control valve includes at least one O-ring seal mounted, in a first sealing position, on a sealing section of a first component thereof to seal a junction between that first component and a second component which junction controls a bleed passage between. The first component is threadingly engaged within the second component. The valve includes a chamber intended to contain liquid up to a required pressure during operation of the valve. The valve includes at least one annular impingement element mounted about a reduced diameter section, relative to the sealing section, of the first component and adjacent thereto with the impingement element. The impingement element includes a bore that tapers away from the O-ring seal, whereby with a pressure in excess of the required pressure acting on the O-ring it will be compressed at least partly into the bore of the impingement element and away from the O ring's first sealing position to take up a second non-sealing position and, with release of the excess pressure, return to its first sealing position.

11 Claims, 9 Drawing Sheets

EXCESS PRESSURE SAFETY RELIEF VALVE

CROSS REFERENCE TO RELATED APPLICATIONS

This application claims priority to the following patent application: (1) New Zealand patent application #605208 filed Dec. 21, 2012; the of the above cited application is hereby incorporated by reference herein as if fully set forth in its entirety.

The present invention relates to liquid pressure control valves. The invention is directed particularly but not solely towards valves for controlling a water supply to or plumbing installations for, various installations such as house's, watering tanks, animal drinking troughs and reservoirs.

BACKGROUND OF INVENTION

Pressure relief valves are usually characterised as having a valve face with some form of seal pressed against it. The force to hold the pressure relief valve closed against pressure is supplied by a spring. The setting of the pressure relief is achieved by compressing the spring to varying degrees using a threaded adjuster. As the inlet pressure increases to the relief setting, the force generated by the inlet pressure exceeds the load supplied by the spring. This allows the seal to be lifted off the valve seat and the excess pressure is relieved.

As this type of relief valve must use such a spring to they require significant space to accommodate them. Springs and associated parts of such pressure relief valves represent several components to manufacture which can be expensive to manufacture and sell.

With valves or water supplies in general a problem can arise should there be abnormal excessive pressure build-up within the valve. For example, where a metal water pipe is connected to the inlet of a valve and the pipe is exposed to heat, such as sunlight, water in the pipe will expand and may create excessive closure pressure within a back-pressure chamber of a valve.

Excessive pressure can also arise within a valve chamber(s) owing to water passage blockage or dynamic components seizing. This can lead to fracture or similar malfunction of one or more of the components of a valve.

Figure 1:
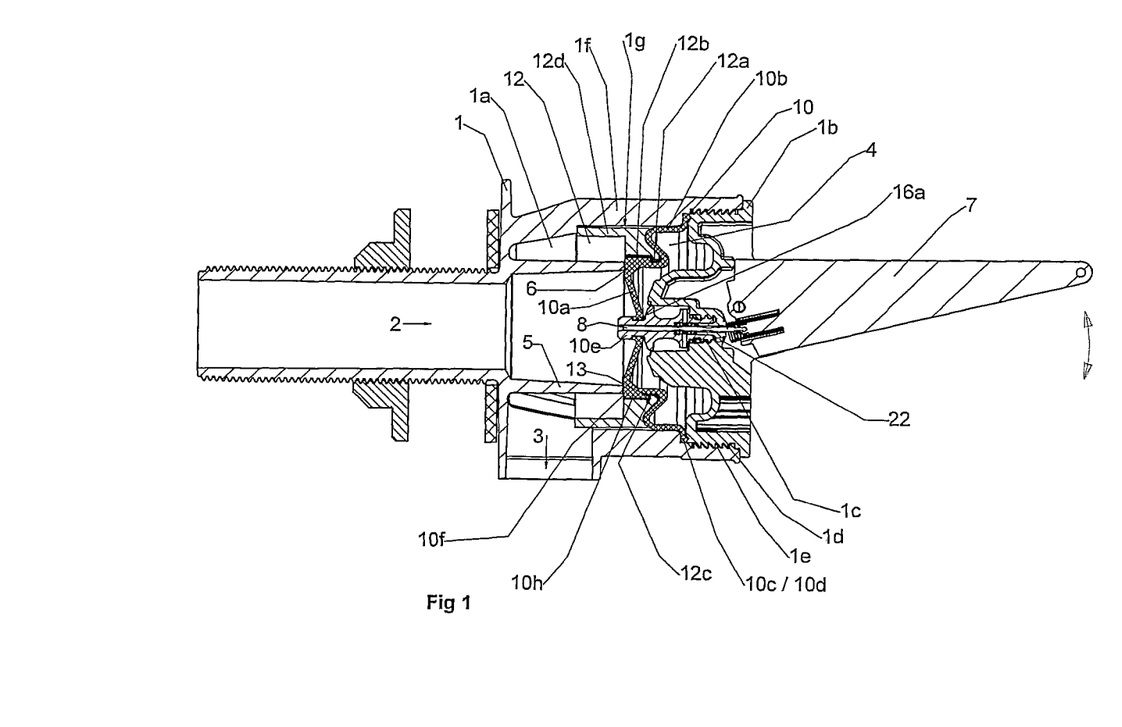
FIG. 1 depicts in cross-section a float control valve in a normal closed position.
Figure 1A:
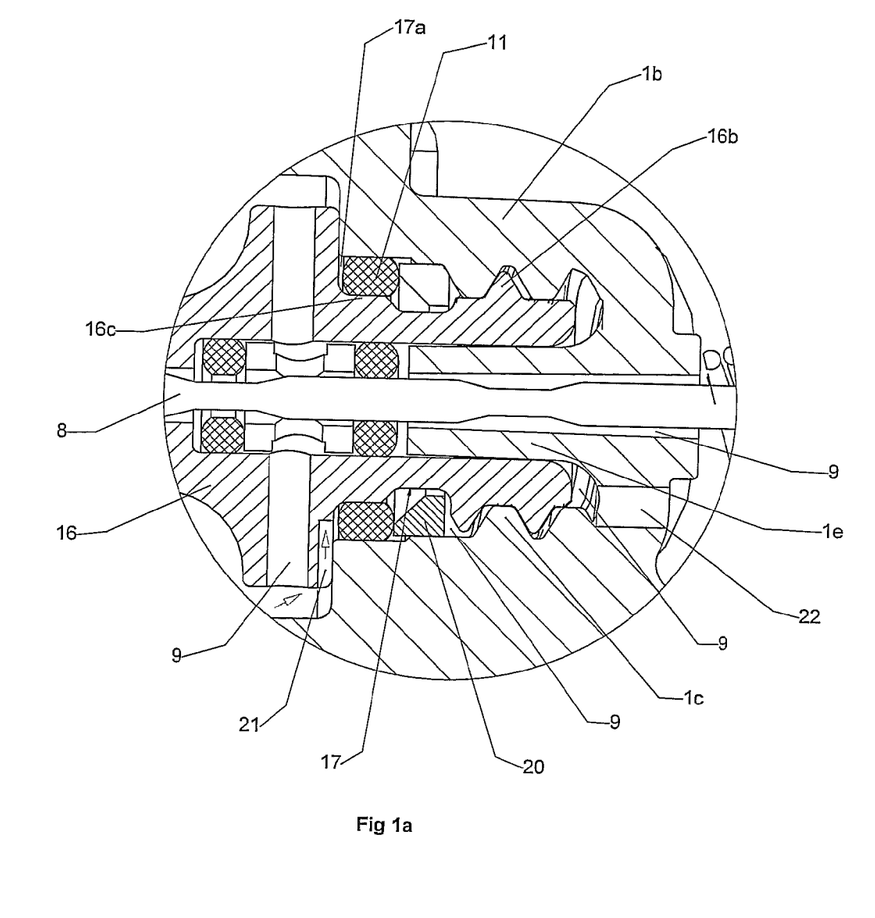
FIG. 1*a* is a close up cross section view of part of the first and second components in a closed position.
Figure 2:
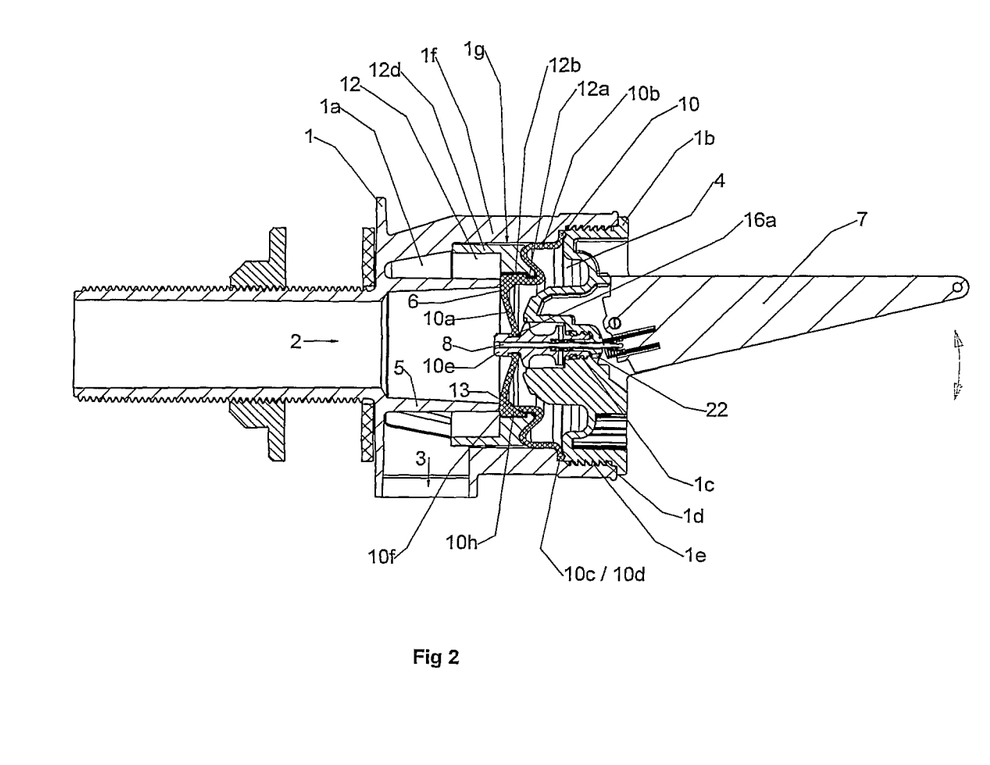
FIG. 2 depicts in cross-section the same valve in a "safety" vented mode as a consequence of excess pressure at the inlet.
Figure 2A:
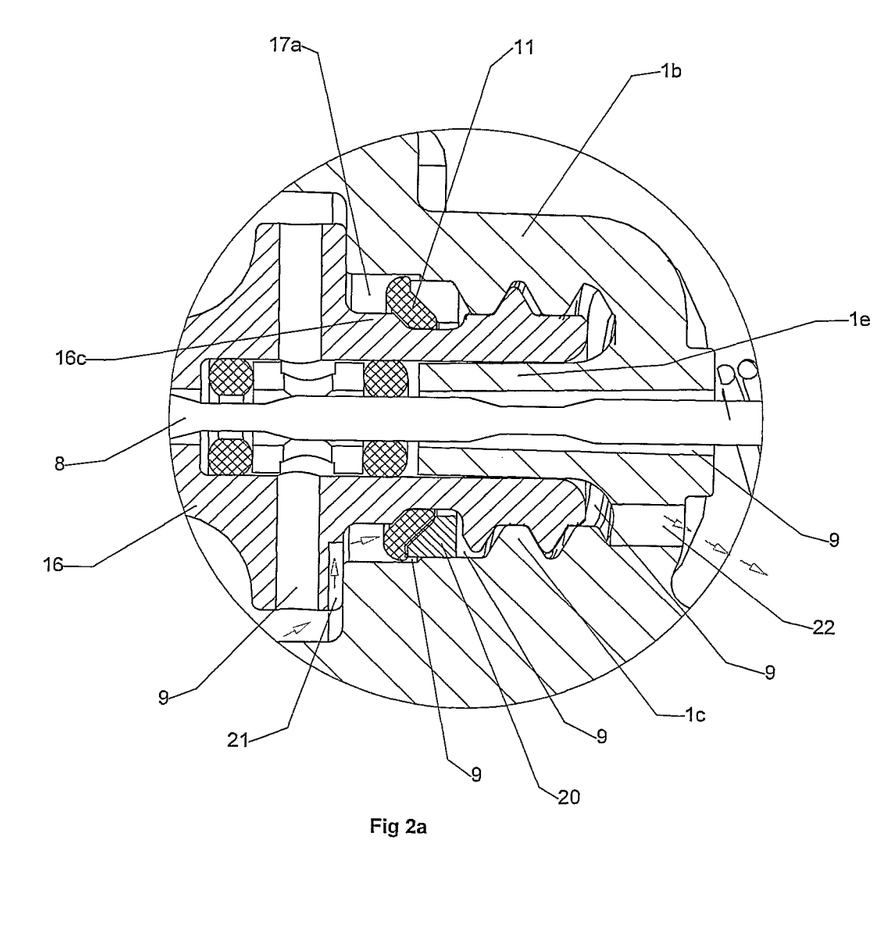
FIG. 2*a* is a close up cross section view of part of the first and second components in an open position.
Figure 3:
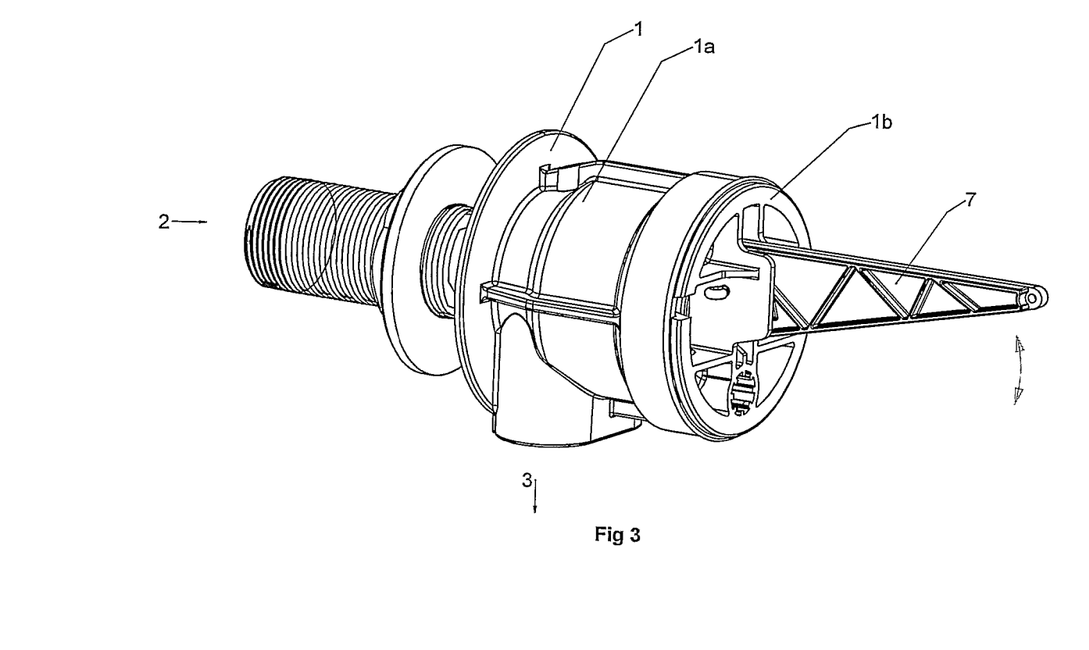
FIG. 3 is a perspective view of a float control valve.
Figure 4:
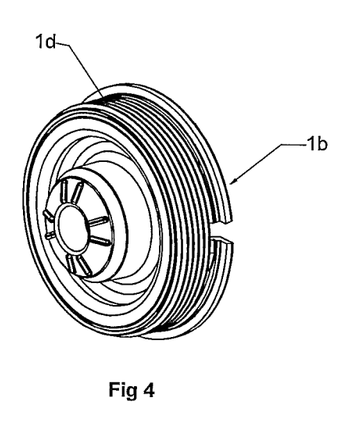
FIG. 4 is a perspective view of a second component of the pressure control valve.
Figure 5:
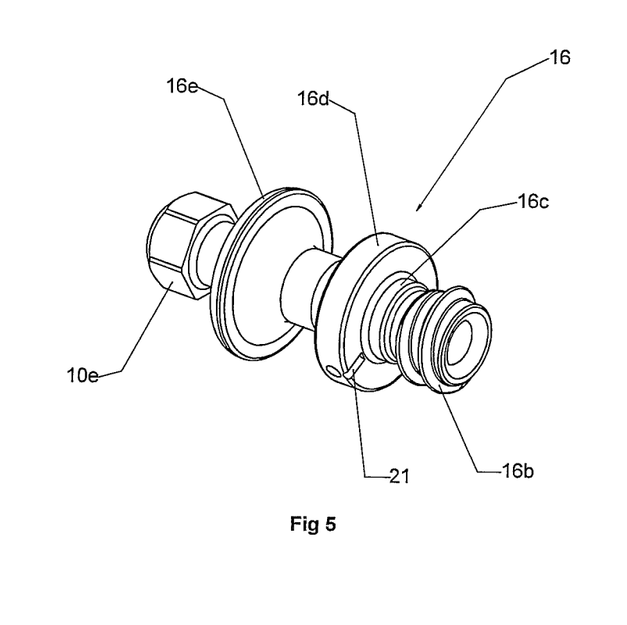
FIG. 5 is a perspective view of the first component.
Figure 5A:
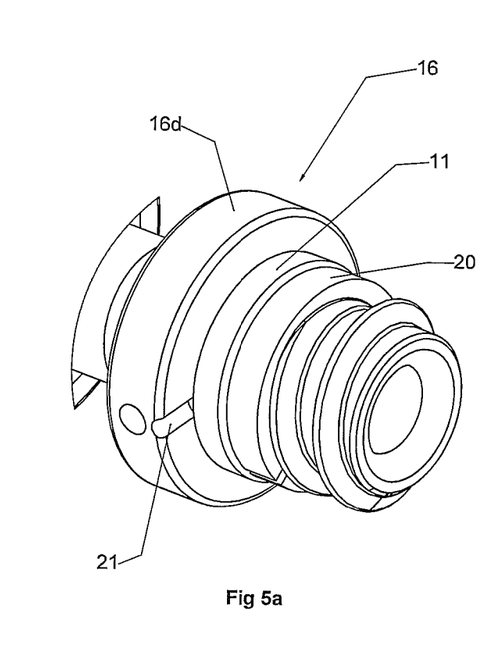
FIG. 5*a* is a close up perspective view of an outlet end of the first component.
Figure 6:
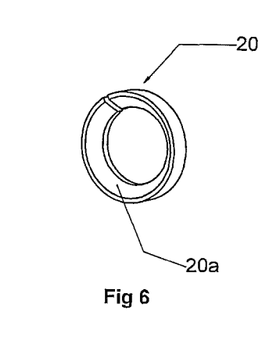
FIG. 6 is a perspective view of the impingement element.
Figure 6A:
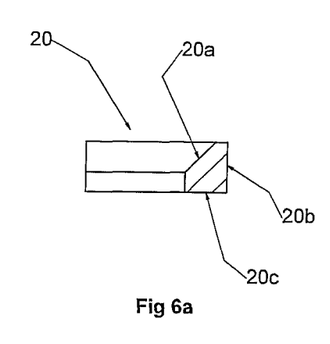
FIG. 6*a* is a section view of the impingement element.
Figure 7:
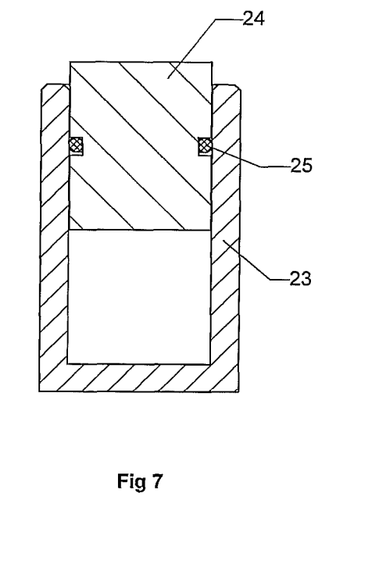
FIG. 7 is a cross sectional view of an O-ring before being forced to seal.
Figure 8:
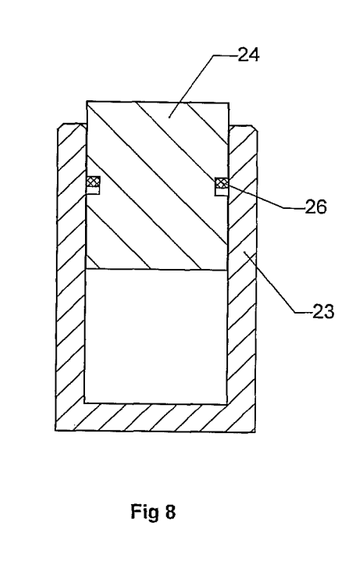
FIG. 8 is a cross sectional view of an O-ring being forced to seal.

Also many such valves include traditional O-ring seals to seal junctions between two other components of the valve. As shown in FIGS. 7 and 8, O-rings are traditionally only used to seal by deforming under pressure. In a normal O ring, application as the pressure behind the O ring increases, the O ring is deformed further and a better seal is created.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

OBJECT OF THE INVENTION

It is therefore the object of the present invention to provide an improved liquid pressure control valve which will obviate or minimise the foregoing disadvantages in a simple yet effective manner or which will provide the public with a useful choice.

Another object of this invention is to provide a safety valve within a parent valve that incorporates at least one such O-ring seal therein sealing a chamber intended to be pressurised during operation of the valve. A further object is to provide a mechanism within that acts with such an O-ring seal as a safety valve within the parent valve to relieve any such excessive pressure. To assist clarity, hereinafter the parent valve as a whole will be referred to as a "pressure control valve" and the excessive pressure relief valve as "a safety valve".

SUMMARY OF THE INVENTION

According to a first embodiment of this invention there is provided liquid pressure control valve including at least one O-ring seal mounted, in a first sealing position, on a sealing section of a first component thereof to seal a junction between that first component and a second component which junction controls a bleed passage between, wherein the first component is threadingly engaged within the second component, a chamber within the valve is intended to contain liquid up to required pressure during operation of the valve, wherein by incorporating as a safety valve therein, the liquid pressure control valve comprising at least one annular impingement element mounted about a reduced diameter section, relative to the sealing section, of the first component and adjacent thereto with the impingement element including a bore that tapers away from the O-ring seal, whereby with a pressure in excess of the required pressure acting on the O-ring it will be compressed at least partly into the bore of the impingement element and away from its first sealing position to take up a second non-sealing position and, with release of the excess pressure, return to its first sealing position.

Preferably the first component is a first rigid component and the second component is a second rigid component whereby the term "rigid" is in relation the component to be able to be used with a pressurized fluid without being too flexible. Preferably the second component is designed as a housing to house the first component.

Preferably the bore of the impingement element is angled internally whereby the O ring is forced away from its first sealing position to be forced inwardly away from the sealing wall of second component 1b to a non sealing position relative to second component 1b thereby providing pressure relief.

Alternatively the bore of the impingement element is angled externally whereby the O ring is forced away from its first sealing position to be forced outwardly into a recess in the sealing wall of second component 1b to a non sealing position relative to first component 16 thereby providing pressure relief.

Preferably the second component is shaped as a cap member with an outer and inner screw thread, and the reduced section of the first component includes an outer screw thread which allows first component to be threadingly engaged within the inner screw thread within the second component whereby the bleed passage is a flow path via an interstice gap there between, is formed to be used when excessive pressure is created.

Preferably the reduced diameter section of first component includes a circumferential groove or space sized to allow the at least one O-ring and impingement element under excessive pressure therein, to be housed whereby the O-ring is compressed under excess pressure there against the tapered bore to allow fluid flow there past.

Preferably the impingement element is a ring shape with a split in the ring shape adapted to allow insertion and location of the element into the groove of first component.

Preferably the flow path includes an entrance 21 recessed into first component and between first and second components which leads directly to the O ring, then to a path between the reduced section and inner threaded surface and then leading to and through exit aperture 22 of second component.

Preferably the bleed passage includes a vent to vent a central portion of the first component.

Preferably the valve includes a valve body with a screw threaded spigot at an inlet end and inner thread at an outlet end to threadingly engage with the external thread of second component, wherein a diaphragm is movably connected to first rigid member which moves whereby movement of the diaphragm is controlled by the presence (or lack) of water pressure in chamber 4 and the pressure in chamber 4 is controlled by the movement of a pin 8 by raising or lowering lever 7.

Preferably the valve includes a pipe adapted to house the first and second components to limit the maximum pressure therein.

Preferably a pressure relief valve includes the valve whereby the valve is a secondary pressure relief valve with the pressure relief valve being a primary pressure relief valve, wherein the primary relief valve includes components such as a seat and moveable diaphragm or a seat and moveable jumper and washer or a seat and moveable ball.

According to a second embodiment of this invention there is provided a liquid pressure relief control valve as described in the preceding paragraph wherein the chamber forms with a flexible member a back-pressure chamber.

According to a third embodiment of this invention there is provided a back-pressure chamber operated liquid pressure relief valve as described in the preceding paragraph wherein the junction is disposed between the back-pressure chamber and a passage that vents the back-pressure chamber when the valve is in an open mode position.

BRIEF DESCRIPTION OF THE DRAWINGS

In further describing the invention reference is made to the accompanying drawings of a preferred embodiment wherein.

DETAILED DESCRIPTION OF THE INVENTION

FIGS. 1, 1*a*, 2, 2*a*, 3, 4, 5, 5*a*, 6, 6*a*, 7 and 8 that relate to a pressure relief, pressure control or safety valve of this invention. A valve 1 depicted is one of our valves and which is the subject of our co-pending NZ patent application #598546 and the description therein is to be considered part of the description of this application. However, while this invention is described with reference to this preferred embodiment it is not intended that the invention be limited to such valves for controlling a water supply whereby other uses are also possible such as plumbing installations where excess pressure or pressure relief is required. As will be clear from the following description the safety valve of this invention will be suitable for use with other valves that include at least one O-ring seal sealing a chamber intended to be pressurised during operation of the valve.

A valve 1 of the present invention is suitable for pressure relief or in relation to excess pressure, in plumbing installations. It may or may not be used in conjunction with a pressure or fluid control in the following example for controlling a pressurised inlet water supply to a typical farm reservoir or animal drinking trough includes a valve body 1*a*. Valve 1 of the present invention includes a first component 16, a second component 1*b*, at least one O ring seal 11 and impingement element 20.

Other components of a pressure relief valve for example in which the valve of the present invention can be included with, can include simply comprise a pipe or vessel which could work as a pressure relief valve in its simplest form or as a pressure relief valve having a screw-threaded spigot (to retain a mounting nut) preferably forms one end section (eg left hand side as in FIG. 1) of the valve body 1*a* to provide an inlet 2. The other end section of the valve body 1*a* is of an increased diameter to form a chamber 4 or cavity open at that end. A removable end cap in the form of an outer member being a second component 1*b* is located in the cavity end of the valve body 1*a* to enclose the cavity within the valve. The inner end of the inlet 2 terminates with an annular wall 5 extending into the cavity. The valve body 1*a* and end cap ie second component 1*b* are joined by engaging screw-threads (spigots) 1*e* provided on each. The valve body 1*a* also includes a spigot 1*f* extending radially outward from a portion of the wall thereof surrounding the inner inlet wall 5 to form a valve outlet 3 for the valve.

A flexible member 10 is mounted within the cavity and separates the inlet 2 from the end cap or second component 1*b* to form a back-pressure chamber 4 (inlet 2 being connected to chamber 4 as described below) between the flexible member 10 and the end cap or second component 1*b*. An exit end (opposite to inlet 2) of an inner bore of second component has an inner thread 1*c*. The inner end of the wall 5 forms a valve seat 6 against which the flexible member 10 seats, the flexible member 10 also separating (providing for opening and closing of the valve) the inlet 2 from the outlet 3, both these functions being described in more detail below.

An actuator arm or lever 7 is pivotally mounted at an inner end thereof to end cap (called second component) 1*b*. In a known manner, a float (not depicted) can be attachable to the outer end of arm 7 to provide for the raising and lowering thereof. Alternatively, rather than a float a "near neutral buoyancy weight" as described in out NZ patent 535912 can be attached thereto. Arm 7 reciprocally operates, if the near neutral buoyancy weight is used, the arm 7 requires a spring raise the arm, a valve opening and closing control pin or spindle 8 mounted in an associated flow path in the form of a bleed passage 9 formed longitudinally through a control pin 8 mounting 16 or first component 16. One bleed passage 9 joins the inlet 2 to the chamber 4 to thus provide the "back-pressure" within the chamber 4. The bleed passage 9 also vents chamber 4 to enable the valve to close and open respectively. First 16 and second components 1*b* can also be referred to as first rigid component 16 and second rigid component 1*b*.

The diaphragm 10 is preferably dish shaped having a central section 10a surrounded by an annular wall section 10b disposed substantially normal or uprightly to the central section 10a. The thickness of the diaphragm 10 is preferably enlarged at the corner junction of the two sections 10a and 10b and the inlet 2 associated face of the diaphragm 10 at that corner junction forms a seal 10f for the valve. Seal 10f impinges against the valve seat 6 to close the valve. The diaphragm 10 is retained about its periphery preferably between abutting shoulders 10c and 10d provided on each of the housing parts 1a and 1b adjacent the screw-threaded junction 1e there between. As more clearly depicted in FIG. 1, the shoulders 1c are the female threads in the second rigid component 1b in FIG. 2 which are longitudinally spaced from the valve seat 6 an amount commensurate to the extent of dishing of the diaphragm 10 provided by the annular wall section 10b thereof.

A slide 12 is coupled to the annular wall section 10b of the diaphragm 10 as to be displaced therewith. Slide 12 is annularly shaped having an outer longitudinally extending inner wall 12d with an inwardly extending shoulder 12b, preferably of an increased wall thickness, at a forward end thereof.

A rebate 12a is formed in the inner wall 12b to form an annular inwardly disposed lip 12c. The annular wall section 10b of the diaphragm 10 includes an outwardly disposed enlargement 10h forming a shoulder 13, the enlargement 10h locating in the rebate 12a of the slide 12 with the lip 12c fitting over shoulder 13 to couple the diaphragm 10 and slide 12 together. The wall 12d of the slide 12 is a sliding fit within the inner face or bore 1g of the section of the body 1a forming the cavity of the valve. The annular wall section 10b of the diaphragm 10 includes an outwardly disposed enlargement 10h forming a shoulder 13, the enlargement 10h locating in the rebate 12a of the slide 12 with the lip 12c fitting over shoulder 13 to couple the diaphragm 10 and slide 12 together. A backing plate is slide 12 which functions to support diaphragm when the valve is closed. It is moved by the diaphragm 10.

The enlargements (see FIGS. 1a and 2a) in the drawings are of the mounting of the pin mounting or inner member comprising a first component 16 threadingly fastened into the housing member or second component 1b. First component 16 is a substantially elongate shaped member having an inlet end and outlet end, with a central shaft with a central passageway to slidably mount pin 8, with ends having a bulb fixing end or jet centre 10e.

Second component 1b which is located at an outlet end of the valve, functions as a cap member with cylindrical walls leading to a recessed end wall and having a central passageway for the first component 16. The cylindrical walls of second component 1b include an external thread 1d and the passageway has an inner thread 1c.

In this example, First component 16 is threadably located within valve 1 and within the second component 1b and includes a base section 16c of the pin mounting (first component) 16 includes external screw-thread 16b which is engaged in an internal or inner screw-thread 1c formed in housing member or second component 1b. Jet centre 10e can be formed as a means to allow rotation there about by hand or with a socket or adjustable crescent. The shaft of first component 16 also includes external thread end flange 16d that stops on the face of second component 1b when first component 16 is screwed in and is provided with an internal entrance pathway or recess 21 (see arrows marked in FIGS. 1a, 2a) as part of a bleed passage 9 for the fluid to abut at least one O ring 11 to cause a first sealing position when not under excessive pressure and the shaft has another flange 16e which is spaced from flange 16d, which is closer to the inlet end and is there to provide a peripheral support to the first component 16 with respect to the second component 1b. Both flanges 16d and 16e extend radially with respect to the shaft.

As in the valve described in our co-pending patent application 598546, and in the present invention as in FIGS. 1-8, at least one O-ring seal 11 is mounted on a sealing section 16c, being the base of the shaft on which screw-thread 16b is formed, to seal the junction between pin mounting or first component 16 and housing member or second component 1b. Referring to the full cross-sectional views, it will be seen this junction, save for O-ring seal 11, would present a leakage path in the form of bleed passage 9 (via entrance 21 and then through the interstice gap between engaged screw-threads 16b and 1c as well as the push-fit junction of pin mounting or first component 16 and out at exit 22 of second component 1b as shown by arrows marked in FIGS. 1a, 2a. Please note that screw-threads (spigots) 1e is nowhere near first component 16 between the back-pressure chamber 4 and the outer section of bleed passage 9 extending through pin mounting or first component 16.

Adjacent the sealing mounting position 16c of O-ring seal 11 an annular rebate, space or circumferential groove 17 is formed between sealing position 16c and the commencement of screw-thread 16b. Correspondingly the commencement of screw-thread 1c is set back to enlarge the void 17a created by rebate 17. At lease one impingement element 20 is mounted in the void 17a and rebate 17, the impingement element 20 including ring like shaped body with a bore that tapers which include an inclined surface 20a inwardly away from O-ring seal 11. In this example, impingement element can be a C-shape being formed of a harder material than O ring 11 which can be a rubber type material, such as plastics. The ring shaped body in cross section has an end wall 20c oriented when in use at right angles to the fluid flow there through the valve (through the bleed passage 9) and a side wall 20b oriented parallel with the fluid flow. In one example the impingement element 20 is in the nature of a rigid C-ring which can be expanded to fit over the stem of pin mounting or first component 16 and into what becomes with assembly void 17a.

Should excess pressure arise in the inlet 2 and thus back-pressure chamber 4 O-ring seal 11 will be displaced from its first sealing position 16c (see the enlargement in FIG. 1a) and compressed at least partly into the bore of impingement element 20 (see the enlargement on FIG. 2a) to take up its second non-sealing position. Thus the back chamber 4 is vented via the aforesaid leakage path 9 and with the excess pressure relieved the seal 11 can decompress and revert to its first sealing position 16c.

In summary first component 16 is threadingly engaged within the second component 1b O-ring 11. Pin 8 does not move with respect to fluid pressure. It is activated by lever 7 are shaped and oriented to slidably move with respect to incoming fluid pressure within second component. Pressure relief is independent of pin 8 and lever 7. O-ring 11 is forced to move from sealing the bleed path or flow path 9 against an inner surface of the outer second component 1b by being squashed, compressed or deformed to move away from sealing second component 1b and—inwardly along or riding up the inclined surface 20a of impingement element 20 to open bleed path 9 from entrance passage 21 formed by a recess in first component 16 and also abutting an entrance to threaded portion 1c of the second rigid element 1b to not seal the entrance to allow fluid flow therethrough between threads ie external screw thread 16b of first component 16 and inner thread 1c of second component 1b and out of exit aperture 22 of the valve—see see arrows marked in FIGS. 1a, 2a.

O-rings are traditionally only used to seal when a certain is pressure is forced upon them whereas in the present invention the opposite is used whereby the O-ring 11 of the present invention is caused to move to unseal but now against a certain oriented surface of impingement element 20 which causes the O-ring 11 to move out of the way to non-seal, to allow fluid flow therethrough.

Fluid is forced by bleed pathway 9 through a pathway from entrance 21, through flange 16d of first component between threads (16b & 1c) and through outlet 22. The flow controlled by the position of pin 8 is a pilot valve to open and close the main diaphragm valve and has nothing to do with the pressure relief function by bleed pathways 9. If there is also no bleed path past seal 11 and out through hole 22, the pressure relief valve will not work.

First component 16 is a mounting for O ring seal 11 and impingement element 20. Second component 1b functions as a housing for first component 16, O-ring 11 and impingement element 20.

In summary first component 16 needs to have:
- a sealing diameter for O ring 11
- a reduced section 17 for the seal to be forced into on over or excessive pressure is experienced, and a means of mounting component 16 into component 1b. In our case the means for mounting is a thread, and a section for mounting the impingement element 20. In our case this section for mounting is a diameter smaller than the thread 16c but as discussed, it could be larger than the thread if the diameter for the O ring seal 11 was also larger.
- a bleed passage to allow high pressure water to act on the o ring
- a bleed passage (in our case down the thread) to allow excess pressure to be vented if the o ring has been displaced by excess pressure as intended Second component 1b can include the following features:
- a sealing bore for O ring 11
- a means of fastening component 16 into it. In our case this is a thread
- a bore to house the impingement element 20
- a bleed passage (in our case a hole 22) to allow excess pressure to escape to atmosphere
- a means for attachment to, in our case, a valve. In other cases, 1b could simply be screwed into a pipe or vessel and would work as a pressure relief valve as described in claim 1.

FIG. 7 shows a generic piston 24 in a cylinder 23 sealed with an O-ring 25. This illustration shows the shape of the O ring under a certain pressure. FIG. 8 shows a generic piston 24 in a cylinder 23 sealed with an O ring 26. This illustration shows the shape of the O-ring when the pressure has been increased substantially. During use in a cylinder or valve, the O ring is flattened and pushed against the wall of the cylinder 23 and the groove in the piston 24. This is the well-known technique of sealing with an O ring where an increase in pressure does not result in a relief of excess pressure. In fact, when the pressure is increased there is a greater contact pressure between the O ring and these parts resulting in a better seal.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

Advantages
Compact design
No need for a spring to energize the seal
Modest cost
Few internal parts required
Robust construction
Relieves excess pressure
Uses an O ring to both seal and not seal
Able to be fitted to any type of control valve
O ring can move outwardly or inwardly
inclined surface of impingement element can be angled inwardly or outwardly
Variations It will also be understood that where a product, method or process as herein described or claimed and that is sold incomplete, as individual components, or as a "kit of Parts", that such exploitation will fall within the ambit of the invention.

The valve of the present invention will work with any float control type valve with a pressure relief valve incorporated into it. The valve in claim 1 will also work with any valve, it will even work on its' own. In other words, one could take the components of present invention and screw them into a chamber (or pipe) to limit the maximum pressure therein. Furthermore the valve in claim 1 will work with any type of control valve (eg flow, pressure, temperature, and liquid level etc), providing a limit to the maximum pressure therein. The valve in claim 1 will work with any pressure relief valve of any design (diaphragm, jumper, ball & seat). If it was used in this application, it would become a secondary pressure relief valve, the pressure relief valve that it was fitted to being the primary pressure relief.

The first component can be termed a first rigid component and the second component can be termed a second rigid component whereby the term "rigid" is in relation the component to be able to be used with a pressurized fluid without being too flexible. In another variation there is no reason why the valve of the present invention, would not work if the operation was inside out. In our design, the O ring 11 is forced inwardly, away from the sealing wall of component 1b to a non-sealing position relative to second component 1b providing pressure relief. If the impingement element 20 was shaped having inclined surface 20a tapering externally instead of internally, the O-ring 11 could be forced outwardly, into a recess in component 1b and into a non-sealing position relative to first component 16. Terms like 'internally' and 'externally' are with respect to the valve as a whole assembly having the first component 16 being within second component 1b as a housing with internally being directed to within the whole assembly.

O ring 11 can be formed of any material that allows it to seal and compress and move over inclined surface of impingement element 20. Similarly impingement element 20 can be any material that allows it to force the O ring to slide accordingly. First and second components 16 & 1b can be formed of any suitable material that allows them to threadingly engage with each other and allowing sealing with O ring 11 and also allow the O ring 11 to move over the impingent element 20. For example first and second components 16 & 1b can be formed from plastics or metal.

The pressure relief valve of the present invention can be used in other valves anywhere, where excessive fluid pressures are used. Our valve has a normal working pressure of 1200 kPa maximum. The pressure relief works at a safety margin above this, so it relieves at say 1500 kPa. However the device could be used at any pressure with design modifications. It might be better to state that the relief valve is designed to open at some pre-determined point above the maximum operating pressure of the valve that it is fitted to. One function of the present invention is to protect the valve from damage due to excess pressure. Fluids can include any liquid or gas etc that able to use the movement of an O-ring 11 with respect to impingement element 20.

Impingement element 20 can be formed as a complete one piece ring with no gap. The sealing section 16*c* and the annular rebate 17 are sized to be larger than the screw thread 16*b* allowing the impingement element 20 to pass over the thread 16*b*. The cross sectional shape of impingement element 20 can include variations whereby inclined surface 20*a* can be formed as a curved surface, recessed or ribbed surface.

First 16 and second 1*b* components can be any shape as long as a space or groove is provided for impingement element 20. There also needs to be room for the O ring seal 11 to move into a non sealing position but this shape could be made as part of the impingement element and a fluid path can be formed there between when the O-ring 11 is caused to move out of the way. In terms of the term "rigid" for components 16 and 1*b*, any type of material is possible as long as it is not too flexible like rubber, that allows the components 16 and 1*b* to act the threading engage with each other and the O ring seal 11 and impingement element 20.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

I claim:

1. A liquid pressure control valve for pressure relief, including an O-ring seal mounted, in a first sealing position, on a sealing section of a first component thereof to seal a junction between that first component and a second component, the junction forming part of a bleed passage extending through a region of actual threaded engagement between a first component thread of the first component and a second component thread of the second component, wherein when the first component thread and the second component thread are threadably engaged they combine to define an outer perimeter of at least a portion of the bleed passage extending therebetween, a chamber to contain liquid up to a required pressure during operation of the liquid pressure control valve, an impingement element mounted about and adjacent to a reduced diameter section, relative to the sealing section, of the first component, and the impingement element including a bore that tapers away from the O-ring seal, whereby with a pressure in excess of the required pressure acting on the O-ring seal, the O-ring seal will be compressed at least partly into the bore of the impingement element and away from its first sealing position to take up a second non-sealing position in which the liquid pressure control valve is configured to allow liquid through the bleed passage, the liquid pressure control valve is configured such that after the release of the excess pressure the O-ring seal returns to the first sealing position in which the O-ring seal blocks the bleed passage.

2. The liquid pressure control valve as claimed in claim 1 wherein the bore of the impingement element is angled externally whereby the O ring is forced away from its first sealing position to be forced outwardly into a recess in a sealing wall of the second component to a non sealing position relative to the first component thereby providing pressure relief.

3. The liquid pressure control valve as claimed in claim 1 wherein the liquid pressure control valve includes a pipe adapted to house the first and second components to limit the maximum pressure therein.

4. A pressure relief valve comprising:
    a secondary pressure relief valve being the liquid pressure control valve of claim 1, and
    a primary pressure relief valve, wherein the primary relief valve comprises one combination of: a seat and moveable diaphragm, the seat and a moveable jumper and a washer, and the seat and a moveable ball.

5. The liquid pressure control valve as claimed in claim 1 wherein the bore of the impingement element is angled internally whereby the O ring is forced away from its first sealing position to be forced inwardly away from a sealing wall of the second component to a non sealing position relative to the second component thereby providing pressure relief.

6. The liquid pressure control valve as claimed in claim 5 wherein the second component is shaped as a cap member with an outer screw thread, and the reduced section of the first component includes the first component thread which allows the first component to be threadingly engaged within the second component thread within the second component whereby the bleed passage is a flow path via an interstice gap there between threads that is to be used when excessive pressure is created.

7. The liquid pressure control valve as claimed in claim 6 wherein the reduced diameter section of first component includes a circumferential groove sized to allow the O-ring and the impingement element under excessive pressure therein, to be housed whereby the O-ring is compressed under excess pressure there against the tapered bore to allow fluid flow there past.

8. The liquid pressure control valve as claimed in claim 7 wherein the impingement element is a ring shape with a split in the ring shape adapted to allow insertion and location of the element into the groove of the first component.

9. The liquid pressure control valve as claimed in claim 8 wherein the flow path includes an entrance recessed into the first component and between first and second components which leads directly to the O ring, then to a path between the reduced section and second component thread and then leading to and through an exit aperture of the second component.

10. The liquid pressure control valve as claimed in claim 9 wherein the bleed passage includes a vent to vent a central portion of the first component.

11. The liquid pressure control valve as claimed in claim 10 wherein the liquid pressure control valve includes a valve body with a screw threaded spigot at an inlet end and inner thread to threadingly engage with the external thread of second component, wherein a diaphragm is movably connected to the first component whereby movement of the diaphragm is controlled by the presence (or lack) of water pressure in chamber and the pressure in chamber is controlled by the movement of a pin by raising or lowering lever whereby the valve body has an outlet end to allow fluid flow there through when being operated.

* * * * *